(12) United States Patent
D'Acunto et al.

(10) Patent No.: US 10,972,778 B2
(45) Date of Patent: Apr. 6, 2021

(54) STREAM CONTROL SYSTEM FOR USE IN A NETWORK

(71) Applicants: Koninklijke KPN N.V., Rotterdam (NL); Nederlandse Organisatie Voor Toegepast-Natuurwetenschappelijk Onderzoek TNO, s-Gravenhage (NL)

(72) Inventors: Lucia D'Acunto, Delft (NL); Piotr Wojciech Zuraniewski, Rijswijk (NL); Simon Gunkel, Duivendrecht (NL); Emmanuel Thomas, Delft (NL)

(73) Assignees: KONINKLIJKE KPN N.V., Rotterdam (NL); NEDERLANDSE ORGANISATIE VOOR TOEGEPAST-NATUURWETENSCHAPPELIJK ONDERZOEK TNO, 'S-Gravenhage (NL)

( * ) Notice: Subject to any disclaimer, the term of this patent is extended or adjusted under 35 U.S.C. 154(b) by 0 days.

(21) Appl. No.: 16/638,678

(22) PCT Filed: Aug. 13, 2018

(86) PCT No.: PCT/EP2018/071897
§ 371 (c)(1),
(2) Date: Feb. 12, 2020

(87) PCT Pub. No.: WO2019/034591
PCT Pub. Date: Feb. 21, 2019

(65) Prior Publication Data
US 2020/0260134 A1 Aug. 13, 2020

(30) Foreign Application Priority Data
Aug. 14, 2017 (EP) .................................... 17186134
Jul. 3, 2018 (EP) .................................... 18181445

(51) Int. Cl.
*H04N 21/2662* (2011.01)
*H04L 29/06* (2006.01)

(52) U.S. Cl.
CPC ..... *H04N 21/2662* (2013.01); *H04L 65/4084* (2013.01); *H04L 65/605* (2013.01); *H04L 65/80* (2013.01)

(58) Field of Classification Search
CPC ......... H04N 21/2662; H04N 21/23439; H04N 21/6125; H04N 21/64738; H04L 65/80;
(Continued)

(56) References Cited

U.S. PATENT DOCUMENTS 9,591,513 B2 * 3/2017 Balasubramanian ....................... H04L 65/4084
2013/0138828 A1 5/2013 Strasman et al.
(Continued)

FOREIGN PATENT DOCUMENTS

WO WO 2014/147538 A1 9/2014

OTHER PUBLICATIONS

Thomas Stockhammer, Dynamic adaptive streaming over HTTP: Standards and Design principles, Feb. 2011, Qualmcomm Incorporated, Conference: Proceedings of the Second Annual ACM SIGMM Conference on Multimedia Systems.*
(Continued)

*Primary Examiner* — Chirag R Patel
(74) *Attorney, Agent, or Firm* — Hamilton, Brook, Smith & Reynolds, P.C.

(57) ABSTRACT

Stream control methods and devices are provided for use in a network (100) for transferring a video stream from a video server (120) to a video client (110) via a distribution chain of network resources (101, 102, 103, 106). A streaming controller (130) controls streaming settings at the client node. A bridge (150) controls the video stream by obtaining
(Continued)

a bandwidth requirement of the video stream, and network resource data including bandwidths available on network resources. The bridge determines a resource allocation including an allocated bandwidth, based on the network resource data and the bandwidth requirement so that the video stream complies with the network resource data. The allocated bandwidth enables the streaming controller to control, in accordance with the allocated bandwidth, the streaming settings for the client. A network controller (140) receives network control data from the bridge to control, in accordance with the allocated bandwidth, the respective distribution chain associated to the respective video stream.

13 Claims, 9 Drawing Sheets

(58) Field of Classification Search
CPC ............. H04L 65/4084; H04L 65/4092; H04L 45/125; H04L 41/0896
See application file for complete search history.

(56) References Cited

U.S. PATENT DOCUMENTS

| | | | |
|---|---|---|---|
| 2015/0156243 A1 | 6/2015 | Skog et al. | |
| 2015/0381690 A1* | 12/2015 | Schmidt | H04L 65/607 709/231 |
| 2016/0142902 A1 | 5/2016 | Ramamurthi et al. | |
| 2018/0027040 A1* | 1/2018 | Bae | H04N 21/2385 709/231 |
| 2018/0131742 A1* | 5/2018 | DiMattia | H04L 65/607 |
| 2018/0191586 A1* | 7/2018 | Chen | H04L 67/10 |
| 2020/0084254 A1* | 3/2020 | Boggia | H04L 65/4084 |

OTHER PUBLICATIONS

Versailles, France, Muiltiple Description-Dash: Pragmatic video streaming maximizing End-Users' Quality of Experience, IEE ICC 2016—Communication QoS, Reliability and Modeling Symposium.*

Tiia Ojanper"a and Heli Kokkoniemi-Tarkkanen, Experimental Evaluation of a Wireless Bandwidth Management System for Multiple DASH Clients, VTT Technical Research Centre of Finland Ltd., 2016 IEEE.*

International Search Report for PCT/EP2018/071897, entitled: Stream Control System for Use in a Network, dated Oct. 2, 2018.

Extended European Search Report for European Application No. 17 186 134.7, Stream Control System for Use in a Network, dated Oct. 26, 2017.

Kleinrouweler, J., et al., "Delivering stable high-quality video: an SDN architecture with DASH assisting network elements," In *Proceedings of the 7th International Conference on Multimedia Systems (MMSys '16). ACM*, New York, NY, USA, , Article 4, 10 page (2016).

Nightingale, J., et al., "QoE-Driven, Energy-Aware Video Adaptation in 5G Networks: The Selfnet Self-Optimisation Use Case," *International Journal of Distributed Sensor Networks*. vol. 12, Issue 1, pp. 1-15 (2016).

Georgopoulos, P., et al., "Towards network-wide QoE Fairness Using Openflow-Assisted Adaptive Video Streaming," In *Proceedings of the 2013 ACM SIGCOMM Workshop on Future Human-Centric Multimedia Networking (FhMN '13)*, pp. 15-20 (2013).

MPEG DASH, "Information technology—Dynamic adaptive streaming over HTTP (DASH)—Part 5: Server and network assisted DASH (SAND)" ISO/IEC CD 23009-5, (Feb. 19, 2015, draft).

* cited by examiner

STREAM CONTROL SYSTEM FOR USE IN A NETWORK

This application is the U.S. National Stage of International Application No. PCT/EP2018/071897, filed Aug. 13, 2018, which designates the U.S., published in English, and claims priority under 35 U.S.C. § 119 or 365(c) to European Application No. 18181445.0, filed Jul. 3, 2018 and European Application No. 17186134.7, filed Aug. 14, 2017. The entire teachings of the above applications are incorporated herein by reference.

FIELD OF THE INVENTION

The invention relates to a stream control system for use in a network. The invention further relates to a bridge device, to a streaming control device, a method and to a computer program comprising instructions for causing a processor system to perform the method.

The network is arranged for transferring at least one video stream from a video server to a video client via a distribution chain of network resources. The distribution chain may have a server node coupled to the video server and a client node coupled to the video client.

BACKGROUND ART

Streaming of video content though the internet, also known as "over-the-top" (OTT), has become increasingly popular in the last decade, with services such as YouTube, Netflix and Hulu. Having to work over the best effort internet, current protocols for streaming OTT video, such as MPEG DASH (Dynamic Adaptive Streaming over HTTP), are based on "adaptive bitrate streaming", where the original video is offered in multiple versions, each characterized by a different video bitrate. Each video bitrate or version may correspond to a different video quality, and may require a different amount of bandwidth to be streamed to the user. Additionally, each version of the video stream may be temporally segmented into a sequence of segments or "chunks", for easier transportation via the HTTP protocol. The video client may constantly estimate the available bandwidth (based for example on the speed at which the last few chunks have been downloaded) and that information may be used by the client to decide which version of the content should be retrieved. The client can also switch quality throughout the video stream to adjust to more or less bandwidth becoming available. These dynamic bandwidth adjustments, which make it possible to provide users with a continuous stream, have enabled OTT services to thrive.

In recent years, more and more devices with a screen have become Internet capable: after computers, phones and tablets, also TVs have started supporting Internet connectivity. VR headsets may also be used to receive streamed video, when connected to a laptop for example. These devices, with high screen resolutions, may demand streaming videos at higher qualities. In a nearby future, one may imagine a household, or other environment with users sharing the same access network, where several of these video streaming-enabled devices may be present, and used concurrently by different family members. These video streaming-enabled devices may also be mobile, and connect to the network via a cellular connection (e.g. 4G or, in the future, 5G), a wireless connection (e.g. WIFI or Bluetooth) or a fixed-line connection.

Reference document [1] "Delivering stable high-quality video: an SDN architecture with DASH assisting network elements" describes, for software defined networking (SDN), a bandwidth assistance mechanism for MPEG DASH streams. This method has three components. First, a DASH player is extended in order to share its available bandwidth and receive bandwidth recommendations, similar to the server and network assisted DASH system (SAND). Secondly, a SDN capable network controller implements specific QoS traffic queues to control the network traffic. Thirdly, a service manager executes specific bandwidth assistance strategies. The document proposes two different bandwidth-assistance methods. In the first method, one queue is for all DASH streams and one further queue is for all non-DASH streams in the whole network with a maximum bandwidth each. Alternatively, one queue may be formed for each DASH stream with a minimum guaranteed bandwidth.

Reference document [2] describes steps for general video adaptation in 5G networks in a framework called SELFNET. The steps are: monitoring, analysis, prediction, decision and deployment. In this regard SELFNET is constantly monitoring QoS parameters and maps them to QoE levels. The acquired metrics are further enhanced with predictions about "when congestion is about to happen". Based on these predictions the SELFNET will make and execute decisions. In the deployment of those decisions it will initiate media adaptation network entities (MANE's) that will control the flow of H265 scalable video coding (SVC) streams. In this way MANE's will be initiated as close to the congestion as possible.

Reference document [3] deals with the issue above through decisions at the content provider side. Specifically, on the basis of measurements about network bandwidth, the content provider decides the bit rate that each video streaming client can request.

Reference document [4] describes a system using SDN for the prioritization of video client streams in a home network according to their capabilities and requirements. The system uses an optimization function to decide the "fair share" of bandwidth for each user, which takes into account the capabilities of the devices requesting the video streams.

SUMMARY OF THE INVENTION

Since adaptive video streaming protocols have been designed to maximize the quality to deliver to the user, having several services using these protocols in parallel in the same access network (e.g. same household or mobile cell/base station) may result in these services to compete for bandwidth. This competition is likely to generate fluctuations in the bandwidth perceived by each video client, which in turn will switch between higher and lower quality versions of the video stream. Such a situation will provide bad quality of experience (QoE) to the end user, which is undesirable. Additionally, users may have preferences as to what devices in their household should get the highest quality (the TV or VR headset for example) and what devices could tolerate receiving lower quality (e.g. the phone). Similarly, in a cellular network, users may have different service subscriptions, with some users having a high quality or high bandwidth subscription and other users having a medium or low quality or bandwidth subscription.

For example, the first method of [1] only differentiates between DASH video streaming clients and the remaining traffic, so it cannot guarantee a specific bandwidth for an individual client. The second method does not safeguard the network from DASH clients requesting more bandwidth than allocated to them, as the method only looks at the minimum bandwidth. Furthermore, there is no mechanism to control individual needs of DASH players.

In [2], the approach attempts to solve a congestion close to where the congestion occurs. If packets are dropped/discarded at the congestion point, this means that bandwidth will be wasted in the parts of the network preceding the congestion point, as those discarded packets will have travelled the network for nothing.

In [3] a "passive" solution is proposed, where the content provider simply measures the current state of the network and decides the bandwidth allocation for each client accordingly. This approach has two major drawbacks: on one hand, it relies on measurements performed by the service provider, which is often located outside of the distribution chain in the operator's network. Also, its application-layer bandwidth measurements may not be very precise or representative of the network situation. The method does not provide any mechanism to change the existing bandwidth allocation on the network to accommodate the streaming clients.

Document [4] does not propose a mechanism to safeguard the network from streaming clients actually requesting more bandwidth than allowed. Furthermore, the sphere of influence of the described system is in the home only, which means that: (i) no optimization of bandwidth per client can be done in the network, and (ii) congestion in the network may still happen.

Hence there is a need for a system that can manipulate bandwidth in the network in such a way to provide video streams to streaming clients at a guaranteed bandwidth, while at the same time safeguarding the network from possible misbehavior of clients (e.g. requesting more bandwidth than available) and/or preventing network congestion before it actually happens.

In accordance with a first aspect of the invention, a stream control system may be provided for use in a network, the network comprising network resources including nodes and links connecting the nodes, and at least one network controller having a network controller interface for exchanging network control data, the network controller being arranged to control one or more network resources; the network being arranged for transferring at least one video stream from a video server to a video client via a distribution chain of network resources, the distribution chain comprising a server node coupled to the video server and a client node coupled to the video client;

wherein the stream control system comprises a bridge unit, a bridge controller and a streaming controller arranged to control streaming settings at the client node;

the bridge unit being coupled to the bridge controller and being arranged to exchange messages with the network controller and the streaming controller by
communicating with the network controller interface, and
communicating with the streaming controller; the bridge controller being arranged to control the video stream by
obtaining, from the streaming controller, at least one streaming-control request, the request including a bandwidth requirement of the video stream;
obtaining, via the network controller interface, network resource data including bandwidths available on network resources,
determining, for the request, a resource allocation including an allocated bandwidth based on the network resource data and the streaming-control request, the allocated bandwidth being equal to, or lower than, the bandwidth requirement so that the video stream complies with the network resource data;
transferring, to the streaming controller, the allocated bandwidth so as to enable the streaming controller to control, in accordance with the allocated bandwidth, the streaming settings for the client; and
transferring, to the network controller, network control data to control, in accordance with the allocated bandwidth, the respective distribution chain associated to the respective video stream; wherein the streaming controller is arranged
to exchange streaming control data with the bridge controller, the streaming control data including the streaming-control request and the allocated bandwidth; and
to control, in accordance with the allocated bandwidth, the streaming settings for the client.

In accordance with a further aspect of the invention, a bridge device is provided for use in the network as defined above, comprising the bridge unit and the bridge controller as defined above.

In accordance with a further aspect of the invention, a streaming controller device is provided for use in the network as defined above, comprising the streaming controller, wherein the streaming controller may be arranged to exchange streaming control data with the bridge controller, the streaming control data including the streaming-control request and the allocated bandwidth; and to control, in accordance with the allocated bandwidth, the streaming settings for the client.

In accordance with a further aspect of the invention, a bridge control method for use in the network as defined above, may be arranged
to cooperate with a streaming controller arranged to control streaming settings at the client node; and
to exchange messages with the network controller and the streaming controller by communicating with the network controller interface, and communicating with the streaming controller;
the bridge method comprising, to control the video stream,
obtaining, from the streaming controller, at least one streaming-control request, the request including a bandwidth requirement of the video stream;
obtaining, via the network controller interface, network resource data including bandwidths available on network resources,
determining, for the request, a resource allocation including an allocated bandwidth based on the network resource data and the streaming-control request, the allocated bandwidth being equal to, or lower than, the bandwidth requirement so that the video stream complies with the network resource data;
transferring, to the streaming controller, the allocated bandwidth so as to enable the streaming controller to control, in accordance with the allocated bandwidth, the streaming settings for the client; and
transferring, to the network controller, network control data to control, in accordance with the allocated bandwidth, the respective distribution chain associated to the respective video stream.

In accordance with a further aspect of the invention, a streaming control method for use in the network as defined above, may be arranged
to cooperate with a bridge controller as defined above, and
to exchange streaming control data with the bridge controller, the streaming control data including the streaming-control request and the allocated bandwidth; and the streaming control method comprises providing, to the bridge controller, at least one streaming-control request, the request including a bandwidth requirement of the video stream;

receiving, from the streaming controller, the allocated bandwidth; and controlling, in accordance with the allocated bandwidth, the streaming settings for the client.

In practice, the network may be a network domain under control of a specific service provider, e.g. an internet service provider (ISP). Such a network may comprise various network resources including nodes and links connecting the nodes, and at least one network controller having a network controller interface for exchanging network control data. The network controller may be arranged to control one or more network resources, e.g. program various settings and structures of links and nodes, which may be called software defined networking (SDN). The network controller may also be part of the Session Management Function (SMF) or Policy Control Function (PCF) envisioned in future 5G network architectures. Similarly, the network resources (links and nodes) may be part of one or more User Plane Functions (UPF), the streaming controller may be part of an Application Function (AF), and the bridge unit and controller may be part of the SMF or AF, where AF, SMF and UPF are elements of the proposed 5G network architectures. Furthermore, whilst the claims and the elucidation below may mention one client, server, video stream, etcetera, in practice, there may be a multitude of each of these elements for the network.

The server node may be a node where the stream(s) as provided by a server enter the network, e.g. an edge node of the network domain, or some node inside the domain if the server is also located in the network domain. A network forwarding element may be part of the ISP network domain coupled to a server in a further network, for example at the edge of the network domain. In that case, the forwarding element is not directly attached to the server. However, if the server is in the ISP network, the network forwarding element might be directly attached to it.

Clients of the service provider may be located in the network. In this context, each application or device that requires a video stream is called a video client, e.g. a television or app at a mobile phone. Actually, one or more video clients at the home of a consumer may be coupled to a home gateway, which gateway then may constitute a client node at an edge of the network and delivers the video stream to the client(s). Similarly, one or more mobile video clients may be coupled to a cell or base station, which then may constitute a client node at an edge of the network and delivers the video stream to the client(s).

The streaming controller may be arranged to control streaming settings of one or more clients coupled to a respective client node. The streaming controller may, for example, be arranged at the client node. In practice, the streaming controller may be combined with the above home gateway at the client node. The streaming controller may then communicate with one or multiple clients on the access network, and may decide to assign respective network streaming settings for each client. Similarly, one or more video clients may be mobile devices accessing the Internet via a cellular network and may be coupled to a base station, which then constitutes a client node at an edge of the network and delivers the video stream to the client(s). The streaming controller may then reside at the base station. In yet another embodiment the streaming controller may be located elsewhere in the access network. The streaming controller may be a DASH aware network element (DANE). Multiple streaming controllers may be used to control streaming settings of multiple clients coupled to respective different client nodes, but, alternatively, one streaming controller may be arranged to control streaming settings of multiple clients coupled to multiple client nodes.

A specific video stream originates at the server which provides the video stream and ends at the respective client which consumes said video stream. The set of network resources that are involved in transferring the stream from server to client is called the distribution chain associated to the video stream. In the current context, the distribution chain starts at a server node coupled (directly or indirectly) to the video server and terminates at the client node coupled to the video client. Each distribution chain may comprise multiple network resources like nodes and links connecting the nodes, which resources may, of course, be shared between multiple video distribution chains and other network users.

The measures in accordance with the invention as defined above have the following effect. The bridge unit may enable an exchange of messages between the streaming controller and the network controller. The bridge controller may obtain, for various network resources, network resource data. For example, this may include predefined available bandwidth data or dynamic, actual bandwidth data for specific resources in the respective distribution chain. The network resource data may include network restriction data defining, for example, maximum bandwidths and/or delays for various nodes and/or links, and may include network configuration or network structure data. The network resource data may also be influenced by the information that the network controller obtains from a PCF located in the network, which PCF provides policy rules regarding specific users or applications. The bridge controller may determine, for each respective received streaming-control request, whether the network resources are capable of complying to the request, based on the network resource data.

Subsequently, the bridge controller may inform the streaming controller if and how the network may comply to the request. For example, the bridge controller may communicate, for each streaming control request, a respective allocated bandwidth to the streaming controller. Also, the bridge controller may transfer, to the network controller, network control data to control the respective distribution chain associated to the respective video stream, so as to accommodate the video stream in accordance with the allocated bandwidth.

Also, the streaming controller may be arranged to exchange streaming control data with the bridge controller. The streaming control data towards the bridge controller may include the streaming-control request. The streaming control data from the bridge controller may include the allocated bandwidth. An advantage is that the streaming controller now may control the streaming settings for the client in accordance with the allocated bandwidth. Effectively, the video stream from the server side may be capped so that it can actually be delivered to the client via the network resources of the respective distribution chain, taking into account the network resource data.

The network resource data may be obtained before actually setting up a distribution chain, e.g. predetermined network resource data regarding the network, or resource data that is regularly updated. In an embodiment, the bridge controller is arranged to obtain the network resource data including bandwidths available on network resources associated to the distribution chain for the video stream. An advantage is that as dynamic network resource data is obtained regarding actual network resources that are in the distribution chain, an accurate bandwidth allocation is enabled.

In an embodiment, the bridge controller may be arranged to obtain the network resource data including delays introduced by network resources; and determine the resource allocation so that the distribution chain complies with a delay requirement of the video stream included in the request. An advantage may be that the performance of the distribution chain regarding delay time may be matched to the delay requirement.

In an embodiment, the bridge controller may be arranged to control, according to the allocated bandwidth, in the distribution chain at least one of a network forwarding element coupled to the video server to cap the traffic of the video stream; and a quality of service manipulation function of a network resource. An advantage may be that capping of the flow of the video stream is effected at the network forwarding element where the video stream of the video server enters the network. Also, the quality of service may be controlled to achieve the required quality of experience.

In an embodiment, the bridge controller may be arranged to maintain client information about currently connected clients, the client information comprising at least one of a client identifier; a client internet protocol address (IP); a client media access address (MAC); a client port number; client video streaming requirements data; client minimum bandwidth; client maximum bandwidth. An advantage may be that actual client data may be managed and used at the bridge.

In an embodiment the streaming controller may be arranged to process the streaming control data comprising at least one of an add command to add at least one new streaming client to a list of clients maintained by the bridge controller;
a delete command to remove at least one client from the list of clients;
an update command to notify the bridge controller that parameters of a client have changed;
a get client command to retrieve values relative to a client on the list of clients;
a client resource update command to communicate a change of the resource allocation for at least one client;
a resource update command to communicate a change of the resource allocation. In a corresponding embodiment, the bridge controller is arranged to process said streaming data. An advantage may be that said streaming control data is exchanged between the streaming controller and the bridge controller so as to effectively determine and allocate bandwidth, while complying with network restrictions according to the network control data.

It will be appreciated by those skilled in the art that two or more of the above-mentioned embodiments, implementations, and/or aspects of the invention may be combined in any way deemed useful.

Modifications and variations of the system, the devices, the server, and/or the computer program, which correspond to the described modifications and variations of the method, and vice versa, can be carried out by a person skilled in the art on the basis of the present description.

BRIEF DESCRIPTION OF THE DRAWINGS

These and other aspects of the invention are apparent from and will be elucidated with reference to the embodiments described hereinafter. In the drawings.

Figure 1:
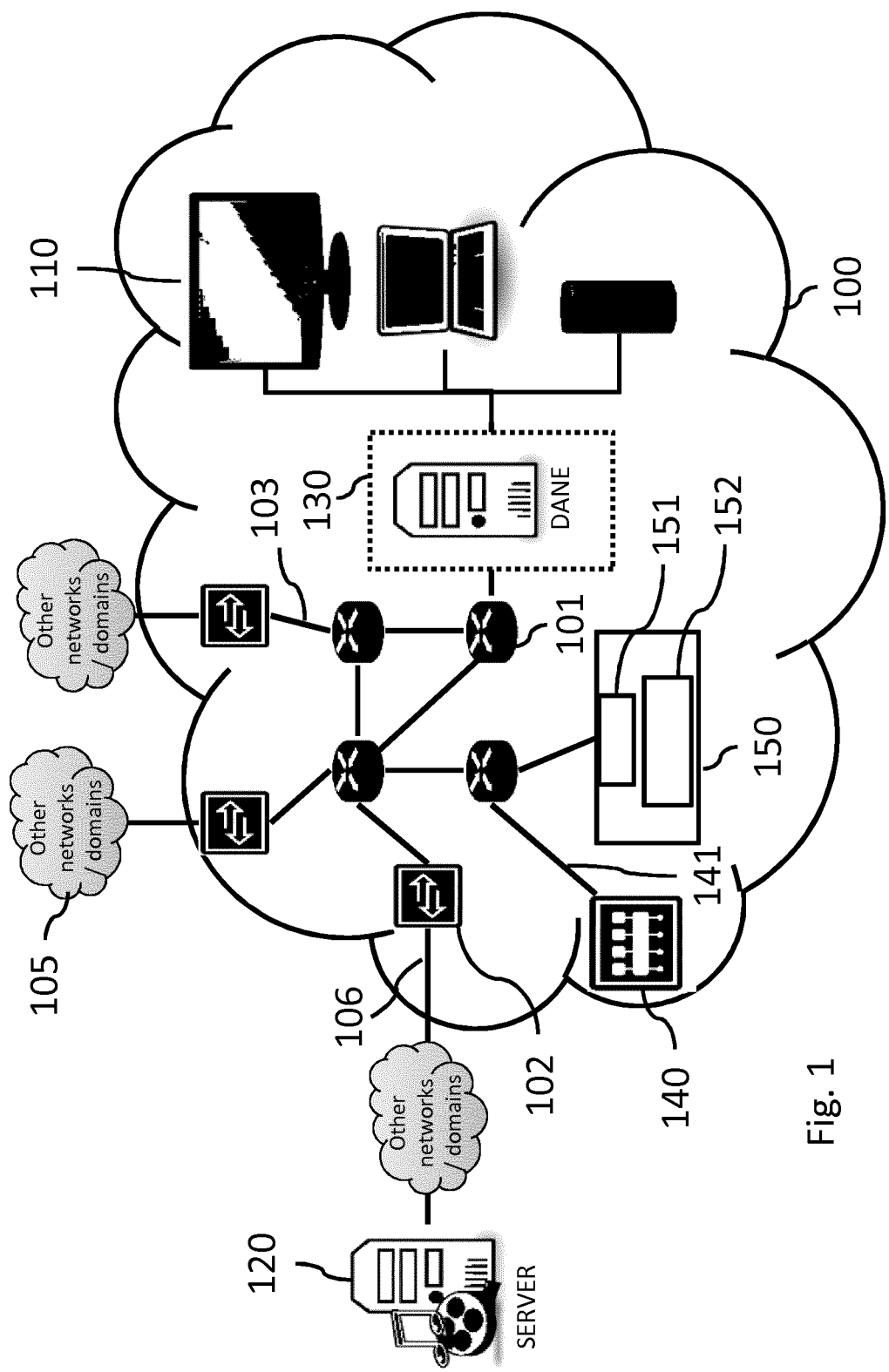
FIG. 1 shows an example of a network having a stream control system.

It should be noted that items which have the same reference numbers in different figures, have the same structural features and the same functions, or are the same signals. Where the function and/or structure of such an item has been explained, there is no necessity for repeated explanation thereof in the detailed description.

DETAILED DESCRIPTION OF EMBODIMENTS

The following describes several embodiments of the stream control system. First, some further general description of the technical concept is provided.

As new internet technologies are evolving, larger pipes capable of delivering larger bandwidths to end users are expected to become available, as well as a "software configurable network architecture", where network resources are programmable and can be dynamically allocated or deallocated according to applications needs. Examples of programmable resources in such future internet are SDN switches, whose filtering behavior can be dynamically programmed via a network controller (also called SDN controller). Resources in future cellular network (e.g. 5G) are also expected to be programmable and based on SDN principles.

To deliver guaranteed bandwidth to video streaming clients in such a network, a stream control system is proposed having a bridge unit coupled to a bridge controller and a streaming controller arranged to control streaming settings. The bridge unit and bridge controller may constitute a bridge device, in a practical embodiment called a MPEG SAND-SDN bridge. The bridge is both connected to a DANE element, usually located somewhere in the access network (e.g. in the household's home gateway or cellular base station), and to an SDN controller, located in the network. The DANE may collect bandwidth preferences or requirements of the connected client devices, as well as a list of devices or application priorities, and transfers such streaming control data to the bridge.

The bridge also obtains network resource data including bandwidths available on network resources, and then determines a bandwidth allocation for each connected client. The bridge then transfers the allocated bandwidths to the streaming controller, and to the SDN controller. The SDN controller receiving the information will create a flow for each of the video clients in the network resources that are involved in transferring the video stream, together called a distribution chain. For example, in links or switches, the flow size is capped to a value corresponding to the bandwidth allocated to clients. The SDN controller may also create flows for (parts of) the remaining traffic and cap their bandwidth as well.

The proposed system enables avoiding the congestion in the network. In fact, if a client requests more bandwidth than the allocated bandwidth, the corresponding stream packets are discarded as they enter the network. In practice, discarding will occur at an SDN switch near the video server, as the network resources have been controlled by the network controller in accordance with the allocated bandwidth to form the respective distribution chain associated to the respective video stream.

On the contrary, in prior network systems, discarding packets may occur close to the client nodes, where the congestion would then happen. Such discarding would be less efficient because the discarded packets would have uselessly consumed bandwidth between the video server and the client node.

Another advantage of the proposed approach is that the whole network does not need to be SDN-capable. It is sufficient if SDN functionality is available at the edge of a domain, or just on the network forwarding elements connected to video sources, since there is where the capping preferably takes place. Also, this approach does not require changes to existing client applications, provided that they provide a bandwidth requirement of a video stream, and accept streaming settings including the allocated bandwidth. For example, DASH client applications already support the MPEG SAND protocol. Also, an existing SDN controller may be used as network controller, provided that it has QoS manipulation functionality enabled and exposes an API to be instructed and report status information.

FIG. 1 shows an example of a network having a stream control system. A network 100 is schematically shown having a multitude of network resources like nodes 101,102 coupled via links 103. So, the network has network resources including nodes and links connecting the nodes, and at least one network controller 140 having a network controller interface 141 for exchanging network control data. The network controller interface may be linked to the network, as schematically shown, or may be a separate control interface. The network controller is arranged to control one or more of the network resources, for example network switches or links. In practice, the network controller may be an SDN controller or an SMF/PCF as elucidated above.

The network may be coupled to other networks or network domains 105. A node at the edge of a particular network may be called an edge node. The node may also be a network forwarding element, when connecting the network to a server or another network. For discussing the current stream control system, the node 102 connecting the network to a server 120 is called a server node, and the node 101 connecting the network to a client 110 is called a client node. In the network as shown, the client node is connected to a home gateway, which may connect to one or more clients. The Figure shows multiple clients 110 such a TV DASH client, a PC or laptop DASH client and a mobile phone DASH client. On such client devices one or more applications may constitute the actual DASH clients that require video streams to be rendered. The forwarding unit can sit at any point in the network being able to control and restrict the usage of links between notes. Further the network controller can be detached from this forwarding unit. In fact, multiple network controllers might be used, with each being in control of one, multiple, or no stream forwarding units, while this combination can also dynamically change.

A video stream may be retrieved from a server 120 via the network. Thereto, the network is arranged for transferring video streams from respective video servers to respective video clients. Each respective stream is transferred via a respective associated distribution chain of network resources. The distribution chain begins at a respective server node that is coupled to the video server, and terminates at a respective client node that is coupled to the video client requiring the respective video stream.

The stream control system in the network as shown has a streaming controller 130 arranged at the client node. In the example, the streaming controller has the function of a DANE (a DASH aware network element; DASH meaning Dynamic Adaptive Streaming over HTTP).

The stream control system in the network as shown has a bridge 150 which may have a bridge unit 151 and a bridge controller 152 arranged in a bridge device. The bridge unit is coupled to the bridge controller and arranged to exchange messages with the network controller and the streaming controller by communicating with the network controller interface, and communicating with the streaming controller, e.g. via separate interfaces to the network controller and the streaming controller, or via a network interface. The bridge translates streaming-control requests of the streaming controller into network configurations for the network controller. For example, the streaming controller may send client information in an add/update command, including bandwidth caps. Then the bridge determines, for each respective received streaming-control request, whether the network resources are capable of complying to the request, based on the network restriction data received from the network controller. Then, the bridge informs the streaming controller if the network can or cannot comply to the request, e.g., by communicating to the streaming controller, for each streaming control request or aggregated requests of a group of clients whose requirements cannot be met by the network resources, some network restriction data regarding the respective requests.

The bridge controller has a processor, embedded software and/or dedicated hardware circuits to control the video stream as follows. Initially, the bridge controller obtains, from the streaming controller, at least one streaming-control request. The request includes a bandwidth requirement of the video stream. Also, the bridge controller obtains, via the network controller interface, network resource data including bandwidths available on network resources. So, the obtained data represents requirements for video streams and availability of network resources, e.g. data representing restrictions in the network. Then, the bridge controller determines, for the request, a resource allocation including an allocated bandwidth based on the network resource data and the streaming-control request. The allocated bandwidth is equal to, or lower than, the bandwidth requirement. Thereby it is achieved that the video stream complies with the network resource data. The bridge controller transfers the allocated bandwidth to the streaming controller. Now the streaming controller is enabled to control, in accordance with the allocated bandwidth, the streaming settings for the client. Also, the bridge controller transfers network control data to the network controller. Thereby, the respective distribution chain associated to the respective video stream is controlled in accordance with the allocated bandwidth. For example, the bridge may hold knowledge of the streaming controllers, network controllers and resources like forwarding units, which information needs to be exchanged from the streaming controllers and network controllers to the bridge.

The streaming controller has a processor, embedded software and/or dedicated hardware circuits to further control the video stream as follows. The streaming controller first exchanges streaming control data with the bridge controller. The streaming control data includes the streaming-control request and the allocated bandwidth. Finally, the streaming controller communicates with the client to the streaming settings for the client in accordance with the allocated bandwidth.

In the above stream control system, if a client requests more bandwidth than the allocated bandwidth, the corresponding excessive stream packets are discarded as they enter the network, at edge node 102 near the video server. This effectively occurs as the network resources have been controlled by the network controller in accordance with the allocated bandwidth to form the respective distribution chain associated to the respective video stream.

Detailed examples of various interfaces and messages between the bridge controller, the network controller and the bridge controller are described below.

In practice, the bridge unit and/or bridge controller may be embedded in other network devices, for example in the streaming controller 130 or the network controller 140.

Figure 2:
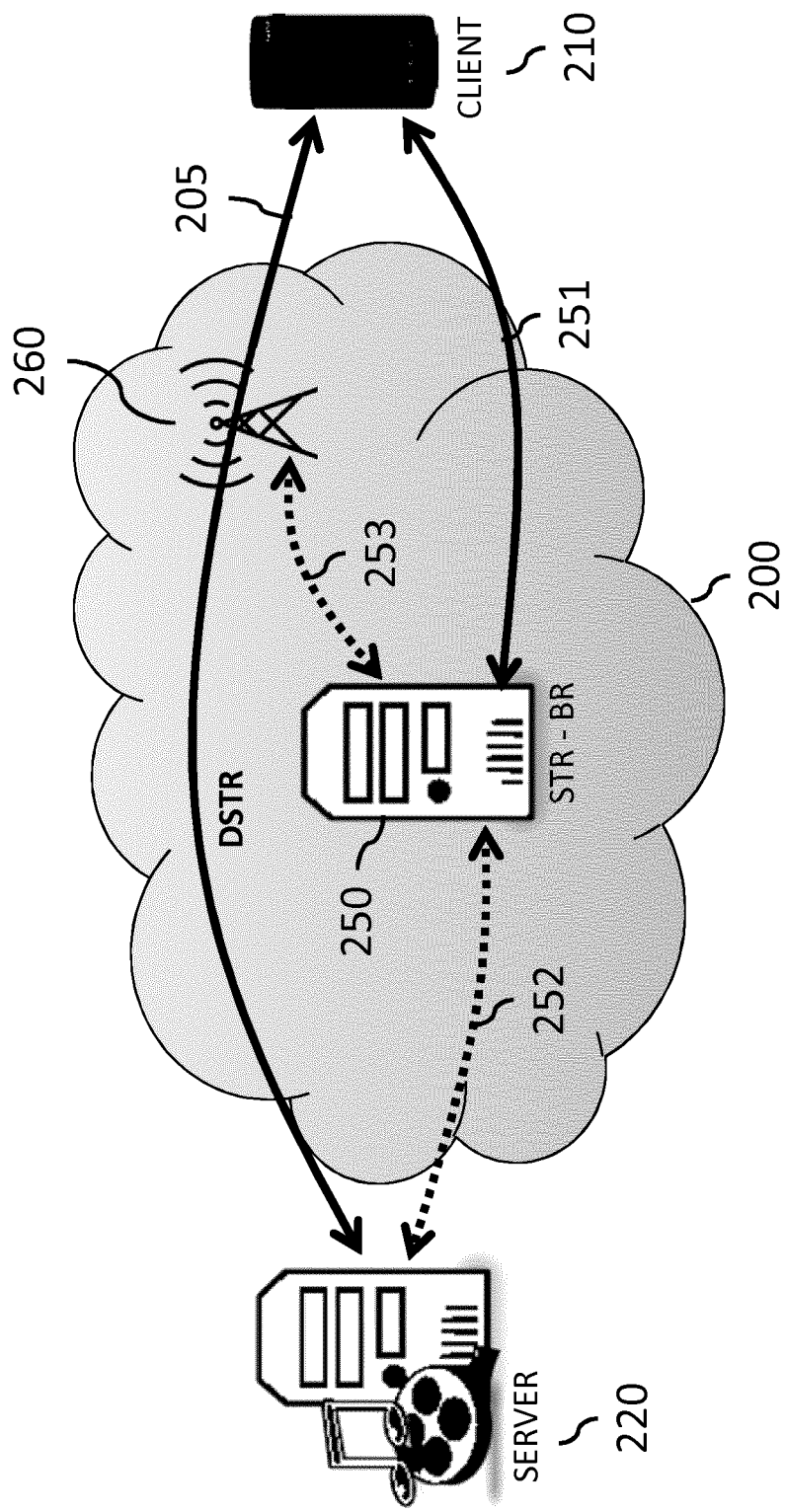
FIG. 2 shows a further example of a network having a stream control system.

FIG. 2 shows a further example of a network having a stream control system. The network is a wireless mobile telephone network, also called cellular network. One or more video clients 210 may be mobile devices accessing the Internet via the network 200 and may be coupled to a base station 260, which then constitutes a client node at an edge of the network and delivers the video stream to the client(s). Effectively a distribution chain 205 from a server 220 to the client is formed via the network.

In the example, the stream control system is embodied in control device 250, which is labelled STR-BR in the Figure, indicating that the device embodies the streaming controller and the bridge, and the network controller. The client communicates with the control device to exchange streaming control data 251. Also, network control 253 data are communicated to the base station as indicated by a first arrow; further network control data 252 is transferred to the server node as indicated by a second arrow.

In practice, video client parameters as maintained by the streaming controller may further comprise elements like
a client device type;
a client application type;
a client application priority;
client user priority data.
Also, the streaming controller may derive or maintain, for a respective client, further parameters in the bandwidth requirement, for example at least one of
a bandwidth preference;
a minimum guaranteed bandwidth requirement;
a video resolution requirement;
a delay time requirement.

Based on the various client data the streaming controller may calculate a bandwidth assignment, and communicate the bandwidth assignment to the bridge. The calculated bandwidth assignment constitutes the bandwidth requirement for a respective client. Subsequently, upon receiving an allocated bandwidth from the bridge, the streaming controller sends the actual available bandwidth to the client. For example, a DANE may now send Resource Update or Client Resource Update messages as received from the bridge controller. Based on allocation messages from the bridge controller, new bandwidth assignments may be calculated.

Figure 3:
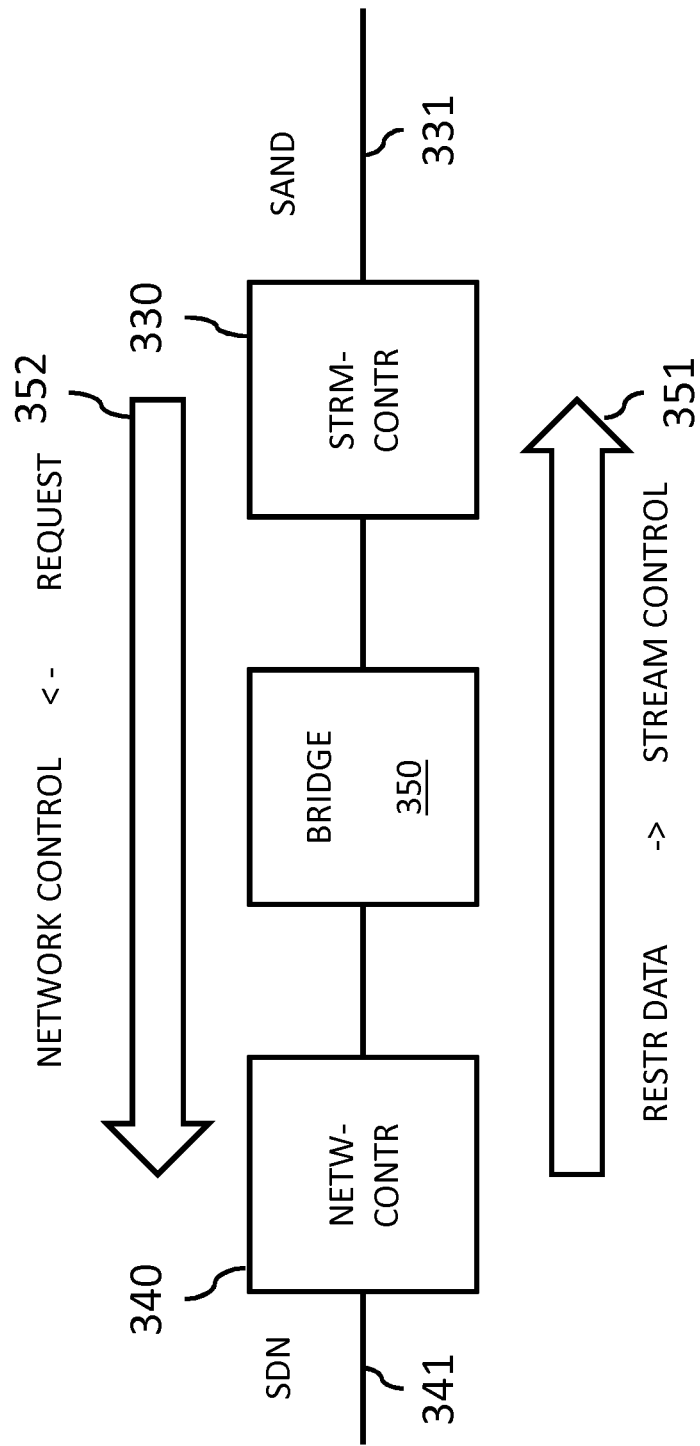
FIG. 3 schematically shows, in a stream control system, the exchange of streaming control data and network control data.

FIG. 3 schematically shows, in a stream control system, the exchange of streaming control data and network control data. The stream control system has a bridge 350 that is coupled, via a network controller interface, to a network controller NETW_CONTR 340. On the other side, the bridge 350 is coupled, via a streaming controller interface, to a streaming controller STRM_CONTR 330. The streaming controller exchanges streaming control data with video streaming clients, e.g. via an MPEG SAND protocol. SAND means Server And Network assisted DASH, which is known as such, for example, from reference document [5].

In this example, the bridge may be called a SAND-SDN Bridge (SSB, for short), which may maintain a data structure containing clients' information. The SSB communicates with the streaming controller, e.g. an MPEG DANE, on one hand, and with the network controller, e.g. an SDN controller, on the other hand. The SSB may, for example, reside in the DANE, or on the same node where the SDN controller is located, or may reside anywhere else in the network, as long as it can receive and send messages to DANE and SDN controller.

As a consequence of the interface DANE<->SSB, the system requires additions to a DANE to support this interface. On the other side, standard SDN controllers may be used, provided they support QoS management, i.e., the ability to be instructed by applications to control network resources regarding structure, settings and parameters, in particular regarding bandwidth.

In a practical embodiment, the SSB may maintain information about the currently connected clients. This information includes 3 types of data:
application-level client identifier (e.g. its client ID as communicated from the client to the DANE via MPEG SAND protocol);
network-level client identifier (e.g. its IP address and TCP/UDP port, TCP ISN or QUIC connection ID, a client identifier included in one of the TCP options fields);
client's video streaming requirements data (e.g. bandwidth requested).

The application-level client identifier uniquely identifies a streaming client (even in the case when the client changes its IP address and/or TCP/UDP port). The network-level identifiers (IP address and TCP/UDP port) identify the current end-point for the video streaming flow, relative to a specific client, which need to be guaranteed by the SDN switches. The client's video streaming requirements (e.g. bandwidth) are used by the SDN switches to configure the streaming flows to that client.

An example of such information stored in JSON format (JSON is a common data format used for asynchronous communication on the web), with three active streaming clients, one with application-level ID "c2", one with application-level ID "c3" and the other with application-level ID "c4", is reported below:

```
{
    "client": {
        "address": "38.123.56.7",
        "id": "c2",
        "port": 5000,
        "bandwidth": 15000000
    }
    "client":{
        "id": "c3",
        "address": "38.123.56.12",
        "port": 4000,
        "bandwidth": 20000000
    }
```

```
"client": {
    "id": "c4",
    "address": "38.44.12.54",
    "port": 3000,
    "bandwidth": 25000000
}
}
```

In the above example, each element in the data structure has a name and value, and therefore the order in which the elements are stored in the structure is not important. However, in another embodiment of this invention, the elements may be defined by their value only, and a predefined order should be maintained, such as:

```
{
    "client": {
        "c2",
        "38.123.56.7",
        5000,
        15000000
    }
    "client": {
        "c3",
        "38.123.56.12",
        4000,
        20000000
    }
    "client": {
        "c3",
        "38.44.12.54",
        3000,
        25000000
    }
}
```

In the above example, the position of "id", "address", "port", "bandwidth" is fixed in the data structure, since these elements are stored without their name. The order is necessary for the SSB to distinguish the various elements.

In yet another embodiment, the network-level client identifier may include the TCM ISN or the QUIC connection ID, which is useful if the client is located behind a NAT. In another embodiment, the network-level client identifier may include an identifier transported in one of the unspecified or experimental option fields of the TCP header.

The interface between the bridge and the streaming controller is described now in a practical embodiment. First the flow from DANE to SSB is illustrated. The communication between the SSB and the MPEG DANE is primarily used by the DANE to instruct the SDN controller regarding the bandwidth cap for each streaming client. This interface (DANE SSB) contains at least two message types, from the DANE to the SSB:

add: this function is used by the DANE to add a group of new streaming clients to the list maintained by the SSB. The parameter passed by this function is a data structure containing, for each client, the elements mentioned above, e.g. "id", "address", "port", "bandwidth". An example of the use of such a function is add (clients), where clients is an object with the following data structure:

```
"clients": [
{
    "address": "38.123.56.122",
    "bandwidth": 7000000,
```

```
    "id": "c9",
    "port": 2000
    "connection_id": 00000000000000A1
},
{
    "id": "c5",
    "address": "38.123.120.7",
    "bandwidth": 17000000,
    "port": 6000
    "connection_id": 00000000000000A2
}
]
```

For the position of the elements in the "clients" data structure, the same consideration as for the maintained data structure apply.

In another embodiment of this invention, the add function can be used to add only one new streaming client, and the parameters the function will take in that case correspond to the elements "id", "address", "port", "bandwidth". An example of the use of such a function would be add (id, address, port, bandwidth). Which means that to add 2 clients like above we need the following calls:

add("c9", "38.123.56.122", 2000, 7000000)
add("c5", "38.123.120.7", 6000, 17000000)

In another embodiment of this invention, the add function can be used to communicate the TCP ISN or QUIC connection ID or the client identifier located in one of the TCP options fields as well (possibly also including the option-kind, which identifies which of the options field in the TCP header contains the client identifier). An example of the use of such a function would be add (id, address, port, connection id, bandwidth). Which means that to add 2 clients like above we need the following calls:

add("c9", "38.123.56.122", 2000, 00000000000000A1, 7000000)
add("c5", "38.123.120.7", 6000, 00000000000000A2, 17000000)

In yet another embodiment of this invention, the add function can be used to communicate a further parameter identifying the streaming server end-point, i.e. the IP address (and optionally the TCP/UDP port). An example of the use of such a function is add(clients, server), where clients is an object with the same data structure as above and server is an object with the following data structure:

```
"server":
{
    "address": "123.45.67.89",
    "port": 1234
}
``` delete: this function is used by the DANE to remove one client from the list, for example when said client has ended its streaming session. The parameter passed by this function is a list of client ids to remove. An example of the use of such a function is delete (client_ids), where client_ids is an object with the following data structure:

```
"client_ids": [
    "c1",
    "c2",
    "c3"
]
```

Additional functions to manipulate the data maintained about the clients may include:

update: used by the DANE to notify the SSB that some details of a client have changed (e.g. the bandwidth requested, or the IP address and/or TCP/UDP port). For each client, this function shall pass at least the client id and the parameters that have changed. Optionally, the other parameters (which haven't changed) may be passed as well. With reference to the data structures above, let us assume that the bandwidths of clients "c2" and "c3" have changed, and all the other parameters remained the same. In that case, an example of the use of such a function is update (clients), where clients is an object with the following data structure:

```
"clients": [
    {
        "address": "38.123.56.7",
        "bandwidth" : 12500000,
        "id": "c2"
    },
    {
        "bandwidth": 17500000,
        "id": "c3"
    }
]
```

As we can observe, even if only the bandwidth has changed for both clients, for client c2 also the address is reported (unchanged), while for client c3 only the parameter that has changed (i.e. bandwidth) is reported. For the position of the elements in the "clients" data structure, the same consideration as for the maintained data structure apply.

In another embodiment, the update function may not be provided. To perform the update, the DANE may first remove the clients whose parameters have changed, and then add them as new clients.

Furthermore, a number of "status" functions may be offered on this interface. These functions do not change the client data maintained, but rather can be used to inspect it. Examples of such functions include:

get_client, this function may be used by the DANE to retrieve the values relative to one specific client, whose id is passed by the function in the request, i.e. get_client (client_id). With reference to the above data structure, calling the function get_client ("c2"), will return the following data structure:

```
{
    "client": {
        "address": "38.123.56.7",
        "id": "c2",
        "port": 5000,
        "bandwidth": 15000000
    }
}
```

For the position of the elements in the "client" data structure, the same consideration as for the maintained data structure apply. As an alternative embodiment, the parameter passed in this function may be a list of client ids, whereby a list of client data structures will be returned. With reference to the data structure above, calling the function get_client (client_ids), where client_ids equals to {"c2", "c4"}, will return the following data structure:

```
{
    "client": {
        "address": "38.123.56.7",
        "id": "c2",
        "port": 5000,
        "bandwidth": 15000000
    }
    "client": {
        "id": "c4",
        "address": "38.44.12.54",
        "port": 3000,
        "bandwidth": 25000000
    }
}
``` get_clients, this function may be used by the DANE to retrieve a list of currently active clients. With reference to the above data structure, calling the function get_clients ( ) will return the following data structure:

```
{
    "client": {
        "address": "38.123.56.7",
        "id": "c2",
        "port": 5000,
        "bandwidth": 15000000
    }
    "client": {
        "id": "c3",
        "address": "38.123.56.12",
        "port": 4000,
        "bandwidth": 20000000
    }
    "client": {
        "id": "c4",
        "address": "38.44.12.54",
        "port": 3000,
        "bandwidth": 25000000
    }
}
``` get_client_ids, which the DANE may use to retrieve a list of client IDs of the currently active clients. With reference to the above data structure, calling the function get_client_ids ( ) will return the following data structure:

```
{
    "ids": [
        "c2",
        "c3",
        "c4"
    ]
}
```

The interface between the bridge and the streaming controller is described further regarding the flow from SSB to the DANE. The interface is used by the SSB to communicate to the DANE changes to the clients' resource allocation and/or regarding the availability of resources in the network in general. The interface (SSB 4 DANE) may contain at least two message types from the SSB to the DANE:

client_resource_update, which is used by the SSB to communicate a change of resource allocation (e.g. bandwidth) for a list of clients individually; this change may be due to, among others, congestion or disruption in the network. For each client, this function shall pass at least the client id and the resource that has changed. Parameters that identify the client, such as its id or IP address or TCP/UDP port, may not be changed. With reference to the above data structure, let us assume that the SSB cannot guarantee the bandwidth allocated to clients "c3" and "c4" anymore. In that case, an example of the use of such a function is client_resource_update (clients), where clients is an object with the following data structure:

```
"clients": [
    {
        "bandwidth": 10000000,
        "id": "c3"
    },
    {
        "bandwidth": 15000000,
        "id": "c4"
    }
]
``` resource_update, which is used by the SSB to communicate a change of resource allocation (e.g. bandwidth) for a list of clients, as a group (i.e. all clients in an household or served by the same cellular base station); this change may be positive (i.e. more resources available) or negative (i.e. less resources available). This function shall pass at least the list of client ids and the resource that has changed. Parameters that identify the client, such as its id or IP address or TCP/UDP port, may not be changed. With reference to the above data structure, let us assume that the joint bandwidth available for clients "c2" and "c3" goes from 35000000 to 50000000. In that case, an example of the use of such a function is resource_update (client_ids, bandwidth), where bandwidth equals to 50000000 and client_ids is an object with the following data structure:

```
"client_ids": [
    "c2",
    "c3"
]
```

The interface between the bridge and the network controller is described now in a practical embodiment. SDN controllers usually expose a so called "northbound API", which can be used to program the resources available in the network. The SSB may use a northbound API that SDN controllers expose to relay information from the DANE to the SDN controller and vice versa. The following embodiment is built with reference to an exemplary SDN controller.

Now the flow from SSB to the network controller is illustrated. The communication interface is used by the SSB to instruct the controller on the setup of the resources for the DASH clients, as requested by the DANE. Below we describe the functions to enable this. For a description of the process executed by the SSB, see below in the section on the SSB Logic. The SSB→controller interface may use:

create_qos_group, this function is used by the SSB to instruct the controller to create a QoS group, for the network management required by the DANE. This function shall pass at least the following parameters: qos_id, qos_type. qos_id identifies the specific QoS group, and qos_type specifies the queuing discipline in the QoS group, i.e. how packets are buffered while waiting to be transmitted.

Let us consider the case create_qos_group (qos_id, qos_type), where qos_id="DANE-QOS-1" and qos_type="linux-htb", where thus the qos_type is set to Linux' Hierarchical Token Bucket.

bind_qos_group, this function is used by the SSB to instruct the controller to bind the QoS group to a specific port of a network switch. With reference to Figure for example, the SSB may instruct the controller to connect the QoS group relative to the DANE in the figure to the left port of the left-most-switch, i.e. the edge switch of the operator/ISP network towards the streaming client. This function shall pass at least the following parameters: qos_id, switch_id, switch_port, where switch id identifies a particular switch on the network and switch_port the port on the switch on which bandwidth capping shall be performed. With reference to the QoS group created above, we have: bind_qos_group (qos_id, switch_id, switch_port), with qos_id="DANE-QOS-1", switch_id="switch-1", switch_port="vs_sw-eth2". Alternatively, if multiple switches in the network shall perform the same capping, bind_qos_group may take as parameters a list of switch_ids and switch_ports on which the QoS group shall be bound.

configure_qos_queue, this function is used by the SSB to instruct the controller on the parameters of a new QoS queue to be created (or of an old QoS queue to be changed). This function takes at least the following parameters: queue_id, config_key, config_value, where the queue_id is related to a specific DASH client (and may be set for example equal to "queue_"+client_id received by the SSB from the DANE), the config_key parameter indicates the aspect we want to control (which is set to "max-rate" in our case, since we need to cap the client's bandwidth) and the config_value provided the value for the parameter we want to control (i.e. the bandwidth value communicated by the DANE). With reference to the data structure mentioned above, the SSB may call the function 2 times as follows: configure_qos_queue("queue_c9", "max-rate", 7000000) configure_qos_queue("queue_c5", "max-rate", 17000000)

add_qos_queue, this function is used to associate the queue relative to a particular DASH client to a QoS group. In this step, the SSB communicates also IP address and TCP/UDP port of the client: add_qos_queue (qos_id, queue_id, client_address, client_port). The SSB may send/call the function 2 times as follows:
add_qos_queue (DANE-QOS-1, "queue_c9", "38.123.56.122", 2000)
add_qos_queue (DANE-QOS-1, "queue_c5", "38.123.120.7", 6000)

delete_qos_queue, this function is used to remove a queue from the list, i.e. when a DASH client has abandoned the system for example. This function takes at least two parameters, the qos_id and queue_id. Let us assume that queue_c5 needs to be deleted. The SSB will call the function as follows:
delete_qos_queue(DANE-QOS-1, "queue c5")

unbind_qos_group, this function is used by the SSB to instruct the controller to unbind (i.e. delete) a QoS group from a specific port of a network switch. This may occur when the DANE is currently not managing any clients anymore (possibly because they all stopped streaming). This function shall pass at least the qos_id, and optionally switch_id, switch_port. If the optional parameters are present, the QoS group may be removed from the specified switch's port only, otherwise, the QoS group may be removed from all switches where it was bound.

In another embodiment of this invention, the add_qos_queue function also contains the TCP ISN or the QUIC connection ID or the client identifier present in one of the options fields of the TCP packet (optionally also including the option-kind, used to identify in which options field the identifier is located).

Now the flow from the network controller to the SSB is illustrated. The interface is used by the network controller to communicate to the SSB changes in the resource allocations to different QoS groups or switch interfaces.

switch_resource_update, which is used by the controller to inform the SSB on the current status of available resources (e.g. bandwidth); this change may be positive (i.e. more resources available) or negative (i.e. less resources available). This function will pass identification parameters of the affected switches (switch_id) and corresponding affected interface (switch_port). A list of the resources whose value has changed, and the new values, is returned. Let us assume that bandwidth changes occur on switch_port="vs_sw-eth2" of switch_id="switch-1", and on switch_port="vs_sw-eth2" of switch_id="switch-2". This function will return a data structure like follows:

```
[{
    "switch_id": "switch-1",
    "switch_port": "vs_sw-eth2",
    "rate": 150000000
},
{
    "switch_id": "switch-2",
    "switch_port": "vs_sw-eth2",
    "rate": 100000000
}]
``` group_resource_update, which is used by the controller to inform the SSB on the current status of available resources (e.g. bandwidth) for a particular qos_group; this change may be positive (i.e. more resources available) or negative (i.e. less resources available). This function will pass identification parameters of the affected qos_group and corresponding affected switches (switch_id) and interface (switch_port). A list of the resources whose value has changed, and the new values, is returned. Let us assume that the SSB manages the bandwidth for different DANEs and that bandwidth changes occur on switch_port="vs_sw-eth2" of switch_id="switch-1", for the QoS_group DANE-QOS-1; and on switch_port="vs_sw-eth2" of switch_id="switch-2", for the QoS group DANE-QOS-3. This function will return a data structure like follows:

```
[{
    "switch_id": "switch-1",
    "switch_port": "vs_sw-eth2",
    "qos_id:" DANE-QOS-1",
    "rate": 50000000
},
{
    "switch_id": "switch-2",
    "switch_port": "vs_sw-eth2",
    "qos_id: "DANE-QOS-3",
    "rate": 70000000
}]
```

The interfaces between DANE and SSB and SSB and controller may be implemented using web communication channels, which might be bidirectional, such as Websockets, or unidirectional, such as REST APIs. When using a bidirectional channel, both ends of the interface can send asynchronous messages to each other. When using unidirectional channels, options to enable communication in both directions include:

2 distinct channels (e.g. REST APIs) on both sides (i.e. one from DANE to SSB and one from SSB to DANE, for the interface SSB DANE, and one from SSB to SDN controller and one from SDN controller to SSB, for the interface SSB SDN Controller), one channel (e.g. REST API) in one direction (i.e. from the SDN Controller to the SSB and from the SSB to the DANE) with the addition of HTML5 server-sent events for the communication of SSB to DANE and from the SDN Controller to SSB, one channel (e.g. REST API) in one direction (i.e. from the SDN Controller to the SSB and from the SSB to the DANE) with the addition of a functionality for the SSB to periodically "poll" the SDN controller and the DANE periodically "poll" the SSB.

Next, the logic processes in the bridge (SSB), as well as the required logic processes in the streaming controller (DANE) are illustrated.

Figure 4:
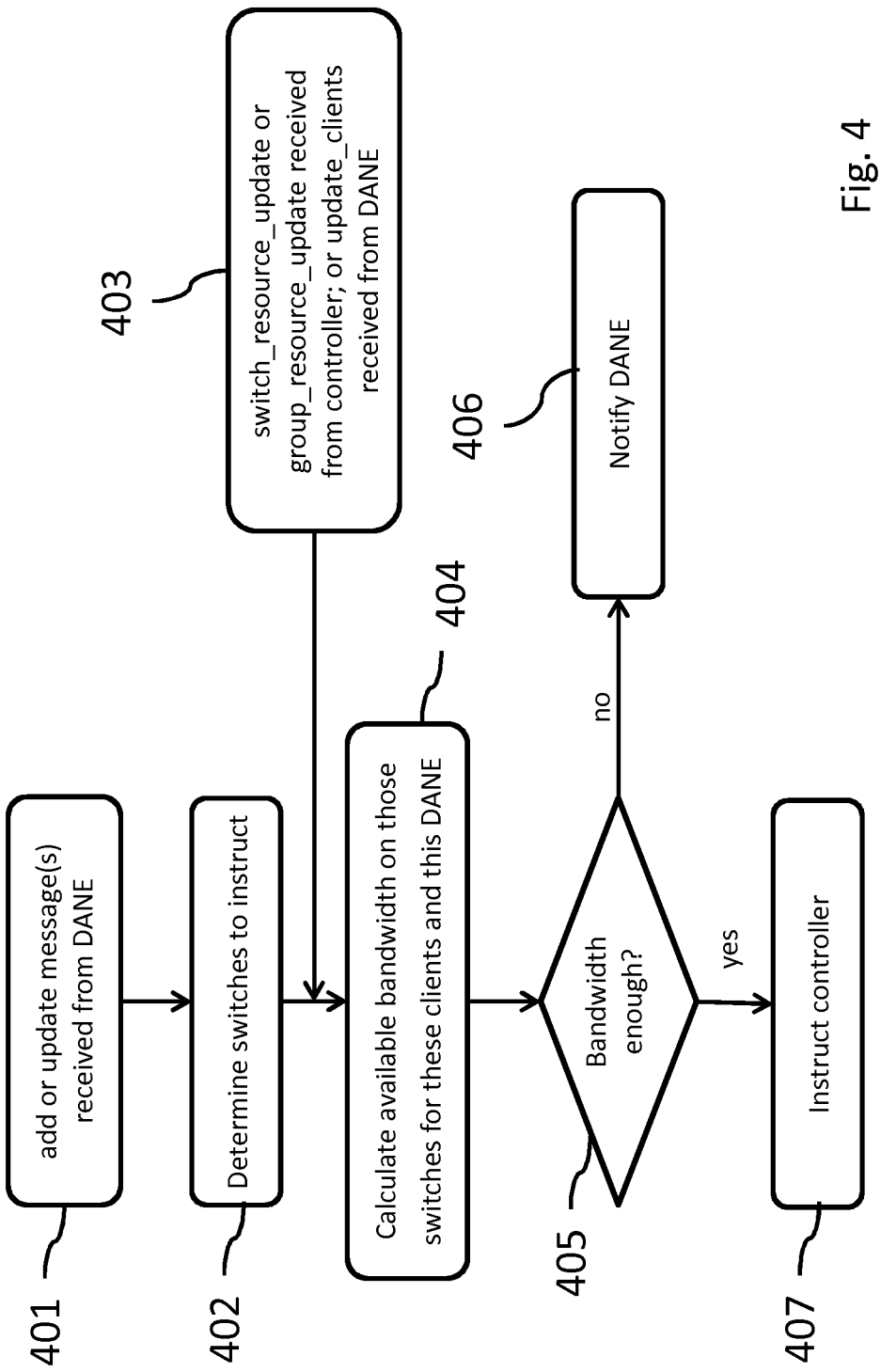
FIG. 4 shows an example of a logic process in the bridge controller.

FIG. 4 shows an example of a logic process in the bridge controller. The process starts at stage 401 by receiving add or update message(s) from the DANE. Next, at stage 402, network resources are found that are in the distribution chain which may need instructions. In stage 403, resource information may be retrieved from the network controller, e.g. via a switch_resource_update or group_resource_update received from controller. Also, an update_clients message may be received from DANE. Usually this step does not happen the first time that a bridge is setting up the resources for a client, but in a subsequent round. Next, in stage 404, available bandwidth is calculated on those switches for these clients and this DANE. In stage 405, it is judged whether there is enough bandwidth to accommodate all requests. If not, the streaming controller is notified in stage 406, e.g., by sending a lower allocated bandwidth. If enough, the network controller is instructed to adapt the network resources accordingly in stage 407.

The Figure illustrates the following. When the SSB receives a message from the DANE about clients whose bandwidths need to be capped, and possibly the streaming server from which they'll be streaming from, it will calculate what switches need to be instructed by the controller with the capping value, it will calculate the available bandwidth at those switches and, if the bandwidth is enough to provide each client with the maximum bandwidth requested (i.e. the capping value), it will proceed to instruct the controller to establish the flows for those clients. If the bandwidth is not enough, it will communicate this to the DANE. Furthermore, every time that a switch_resource_update or group_resource_update message is received from the controller or an update_clients message is received from the DANE, the SSB may proceed to again calculate the available bandwidth on the switches and instruct the controller (or inform the DANE) accordingly.

Figure 5:
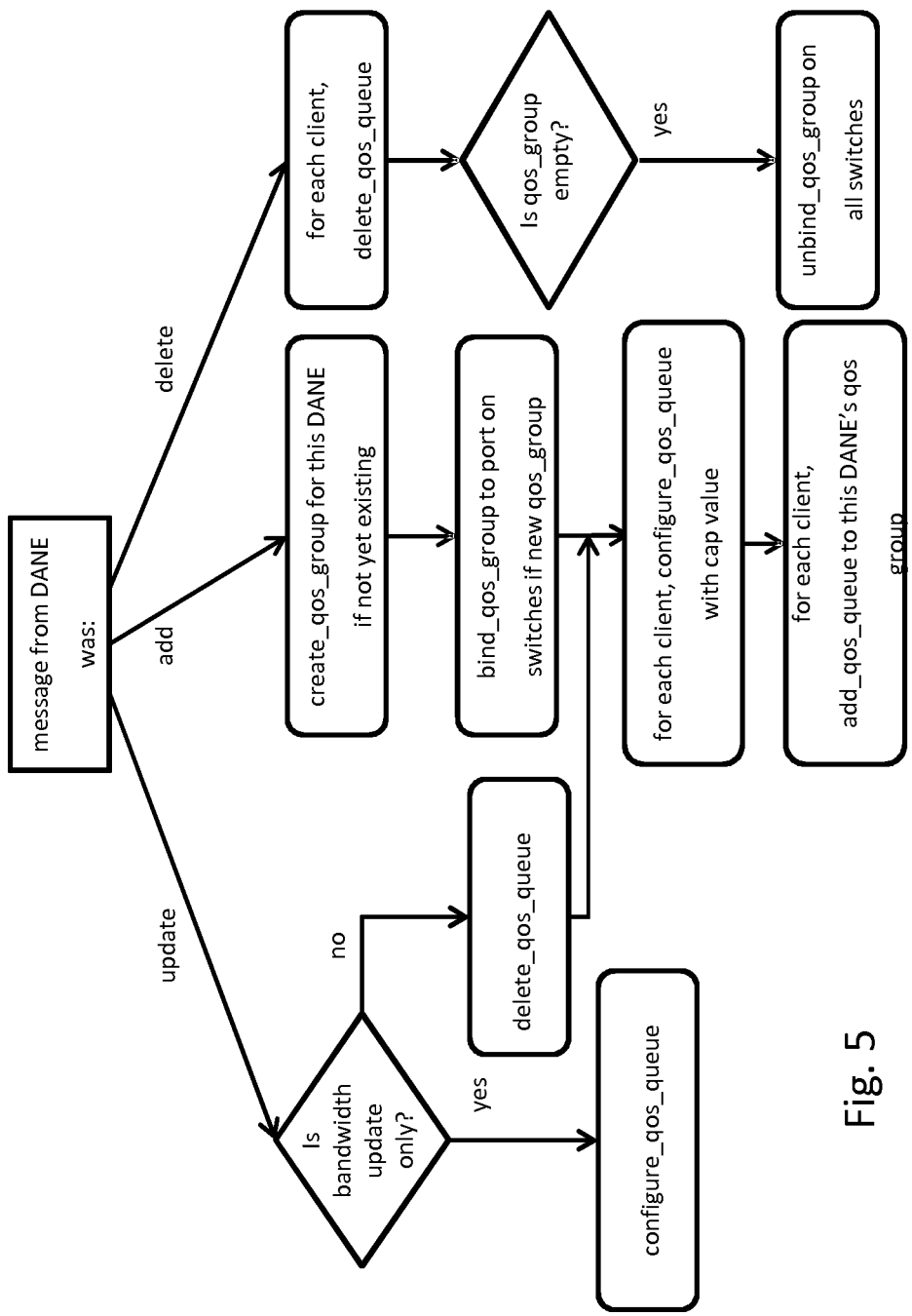
FIG. 5 shows an example of a further logic process in the bridge controller.

FIG. 5 shows an example of a further logic process in the bridge controller. The Figure illustrates how the bridge may instruct the network controller in response to various commands received from the streaming controller (DANE). The process executed by the SSB to instruct the controller is pictured in detail.

If the bandwidth for a specific client changes, the SSB may call the configure_qos_queue function again passing the new bandwidth value. If the TCP/UDP port or IP address for a specific client changes, then the SSB may call the add_qos_queue function, passing the new values for IP address and TCP/UDP port.

In order to implement the bandwidth cap for each client, the SSB instructs the controller to create a QoS group relative to the network management required by the DANE (if it has not yet done so). Next, the SSB instructs the controller to connect the QoS group to a port on the various network switches where capping needs to be implemented. With reference to FIG. 1 for example, the SSB may instruct the controller to connect the QoS group relative to the DANE 130 in the figure to the port of interface 106 of switch 102, i.e. the edge switch of the operator/ISP network towards the streaming server.

For each client for which bandwidth capping is needed, the SSB instructs the controller to create a different queue and associate the client to it. Then, the SSB instructs the controller to assign to each queue a bandwidth cap value, corresponding to the cap value decided by the DANE for each DASH client. Then, each of these queues is added to the QoS group relative to the DANE. Additionally, the SSB may instruct the controller to create one (or more) additional QoS groups for the remaining traffic on the network, e.g. non streaming traffic.

Figure 6:
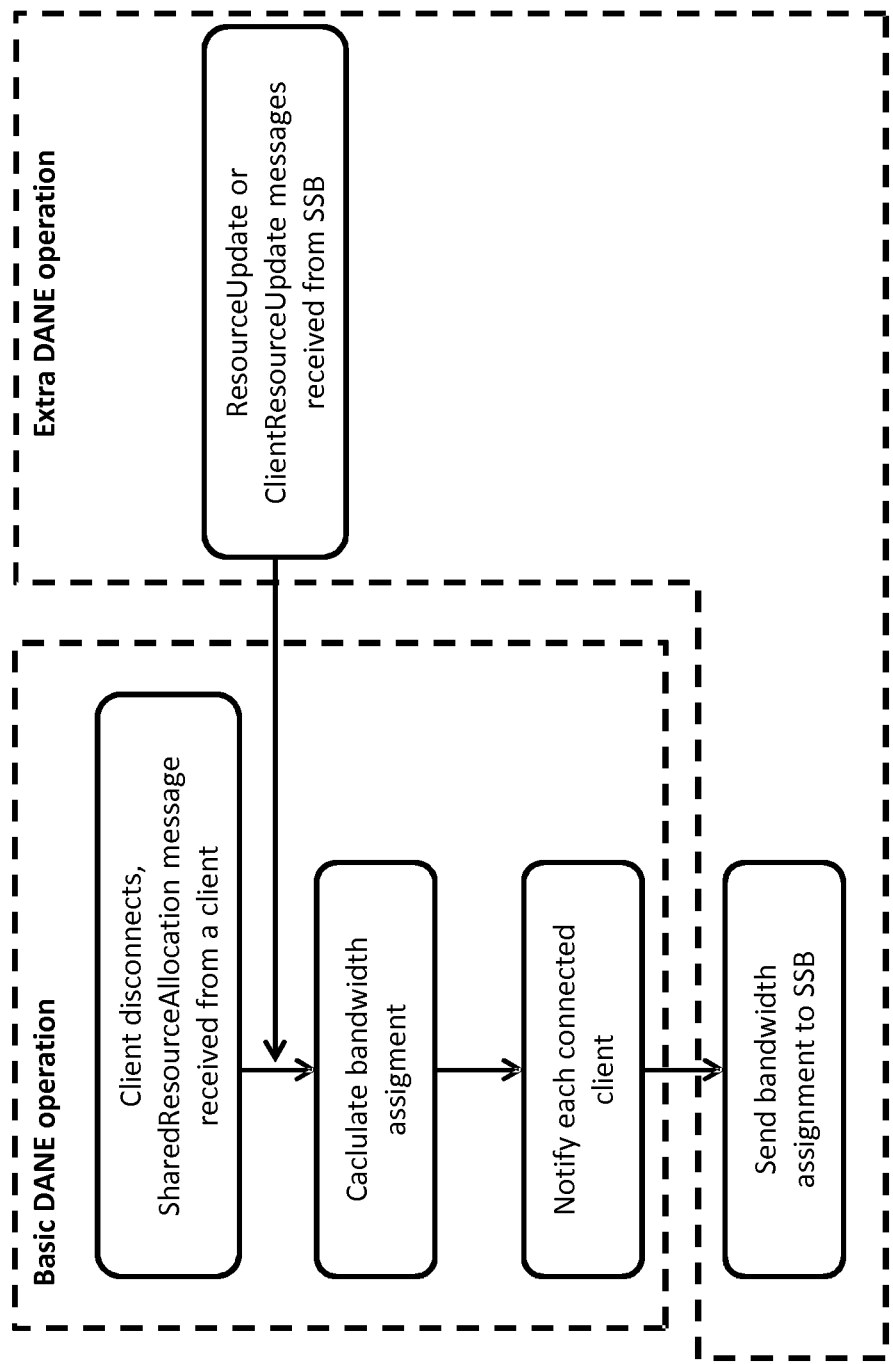
FIG. 6 shows an example of a logic process in the streaming controller.

FIG. 6 shows an example of a logic process in the streaming controller. The process is executed by the DANE when allocating resources to DASH clients. The process includes an additional operation, which sends the bandwidth assignment as required to SSB, as well as allocation data received from the SSB, such as ResourceUpdate or ClientResourceUpdate messages.

The communication with the SSB requires that every time that the DANE computes a new resource allocation, this information is communicated to the SSB. Triggers for a new resource allocation are both "traditional" triggers, e.g. as a consequence of the MPEG SAND standard, as well as "extra" triggers, e.g. coming from the SSB 4 DANE interface. Traditional triggers for the computation of a new resource allocation may include: a client disconnecting and a client sending the SharedResourceAllocation message. Extra triggers may include: the SSB sending a ResourceUpdate or a ClientResourceUpdate message.

Figure 7:
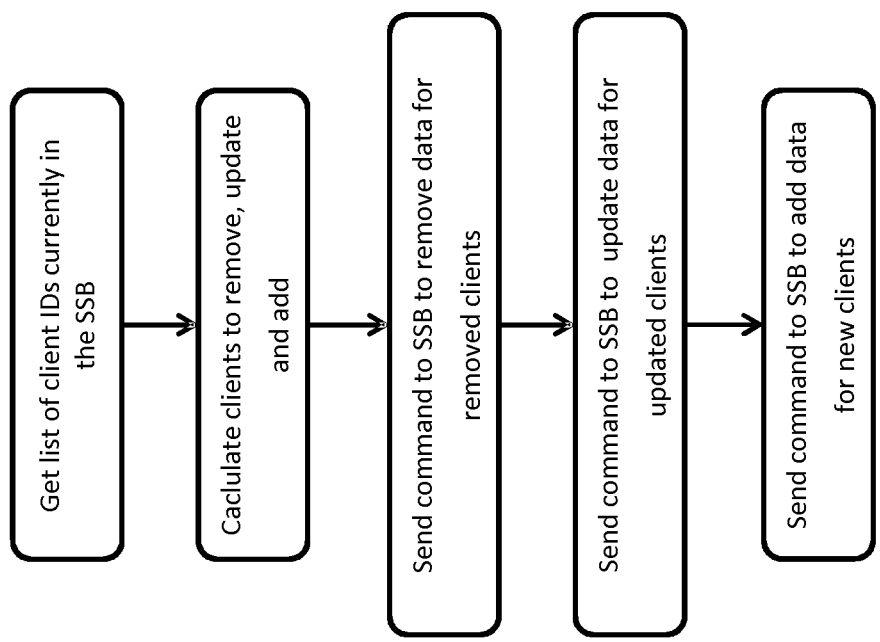
FIG. 7 shows an example of a further logic process in the streaming controller.

FIG. 7 shows an example of a further logic process in the streaming controller. The process is executed by the DANE to send bandwidth assignments to the SSB.

When sending bandwidth assignments to the SSB, the enhanced DANE proceeds as follows. It first retrieves the list of IDs for the clients currently registered in the SSB. This list can either be retrieved by asking the SSB or may be retrieved by a local storage at the DANE. Based on this list and on the list of the clients that took part in an earlier bandwidth assignment step (see FIG. 4), the DANE derives the clients that need to be removed from, modified in, and added to the SSB. Then the DANE proceeds to ask the SSB to remove the clients that need to be removed, to update the clients that need to be updated and to add the clients that need to be added. The order of the last three steps does not matter; the process is depicted in FIG. 7. Optionally, when adding new clients to the SSB, the DANE may communicate the end point (e.g. IP address and possibly TCP/UDP port) of the streaming server from which the clients will be streaming content from.

Figure 8:
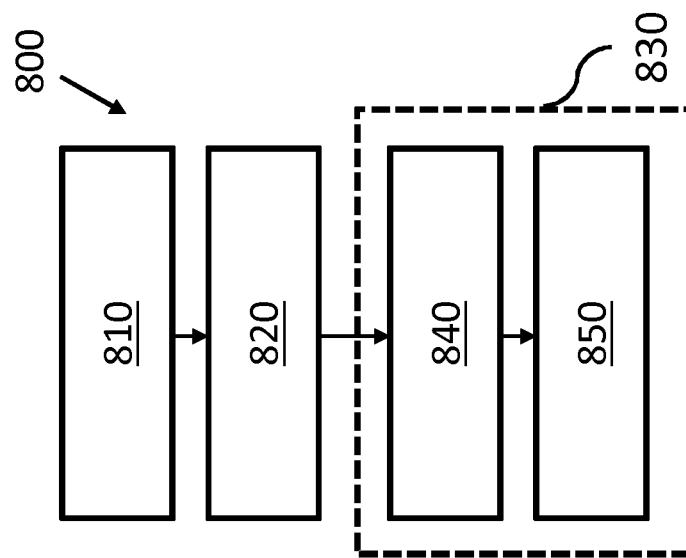
FIG. 8 shows a bridge control method for use in the network.

FIG. 8 shows a bridge control method 800 for use in the network as described above. The bridge control method is arranged to cooperate with a streaming controller arranged to control streaming settings at the client node; and to exchange messages with the network controller and the streaming controller by communicating with the network controller interface, and communicating with the streaming controller. The streaming controller and the network controller have been described above.

The method may comprise, to control the video stream, in an operation OBTRQ 810, obtaining, from the streaming controller, at least one streaming-control request, the request including a bandwidth requirement of the video stream. Also, in an operation OBTNR 820, obtaining, via the network controller interface, network resource data including bandwidths available on network resources. Then, in a process DTR 830, determining, for the request, a resource allocation including an allocated bandwidth based on the network resource data and the streaming-control request. The allocated bandwidth may be equal to, or lower than, the bandwidth requirement, but is set so that the video stream complies with the network resource data. Then, in a step TRAB 840, the method transfers, to the streaming controller, the allocated bandwidth so as to enable the streaming controller to control, in accordance with the allocated bandwidth, the streaming settings for the client. Then, in a step TRNC, the method transfers, to the network controller, network control data to control, in accordance with the allocated bandwidth, the respective distribution chain associated to the respective video stream. The method 800 may be implemented on a processor system, e.g., on a computer as a computer implemented method, as dedicated hardware, or as a combination of both.

Figure 9:
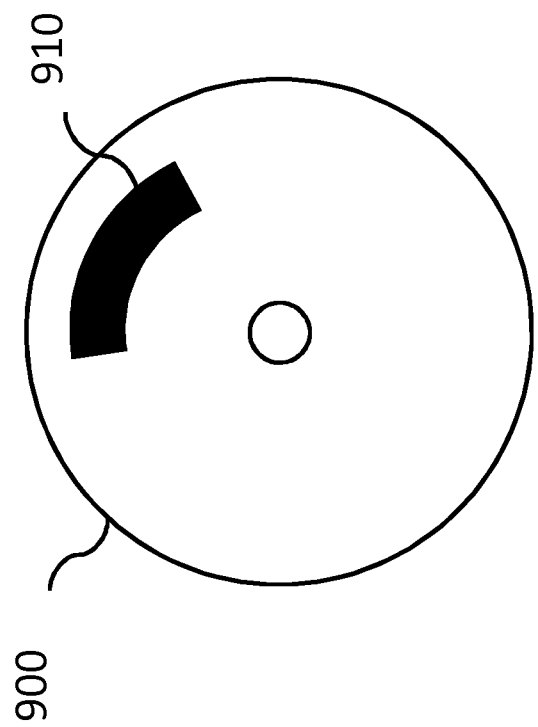
FIG. 9 shows a transitory or non-transitory computer-readable medium.

FIG. 9 shows a transitory or non-transitory computer readable medium, e.g. an optical disc 900. As also illustrated in FIG. 8, instructions for the computer, e.g., executable code, may be stored on the computer readable medium 900, e.g., in the form of a series 910 of machine readable physical marks and/or as a series of elements having different electrical, e.g., magnetic, or optical properties or values. The executable code may be stored in a transitory or non-transitory manner. Examples of computer readable mediums include memory devices, optical storage devices, integrated circuits, servers, online software, etc.

Figure 10:
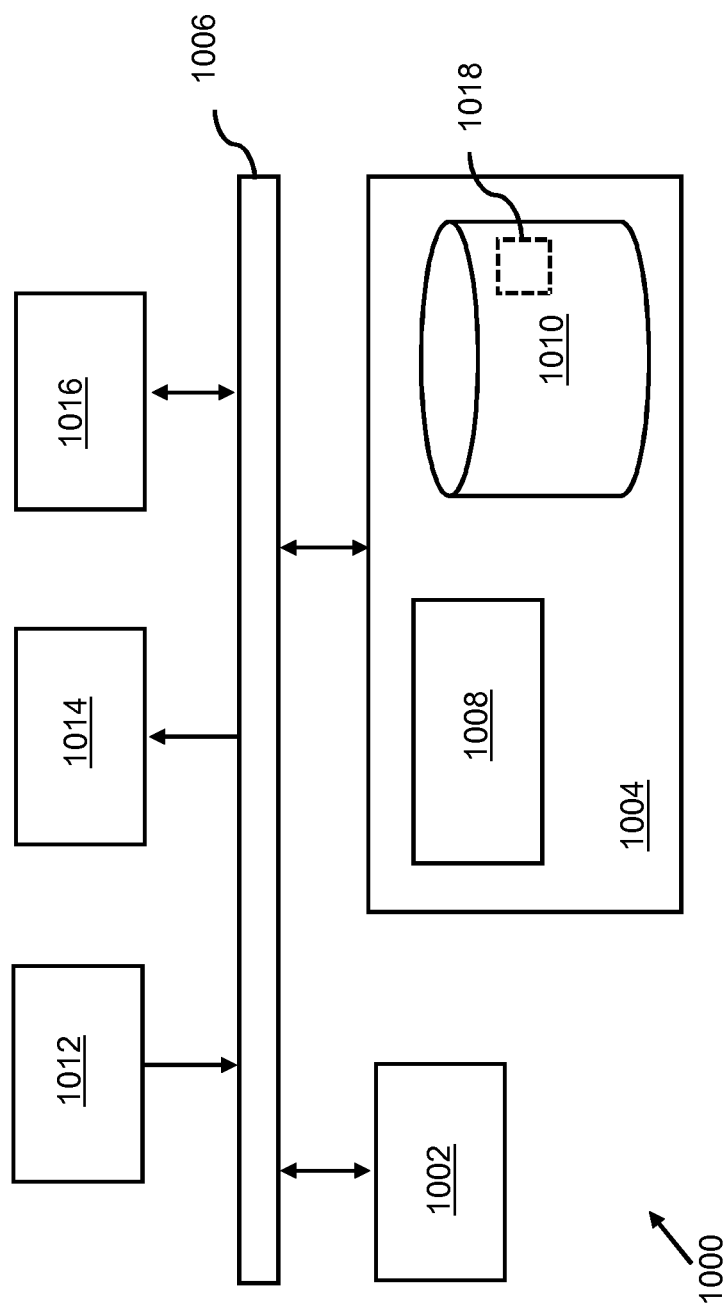
FIG. 10 shows an exemplary data processing system.

FIG. 10 shows a block diagram illustrating an exemplary data processing system that may be used in the embodiments of this disclosure. Such data processing systems include data processing entities described in this disclosure, including but not limited to the bridge controller and the streaming controller. Data processing system 1000 may include at least one processor 1002 coupled to memory elements 1004 through a system bus 1006. As such, the data processing system may store program code within memory elements 1004. Further, processor 1002 may execute the program code accessed from memory elements 1004 via system bus 1006. In one aspect, data processing system may be implemented as a computer that is suitable for storing and/or executing program code. It will be appreciated, however, that data processing system 1000 may be implemented in the form of any system including a processor and memory that is capable of performing the functions described within this specification.

Memory elements 1004 may include one or more physical memory devices such as, for example, local memory 1008 and one or more bulk storage devices 1010. Local memory may refer to random access memory or other non-persistent memory device(s) generally used during actual execution of the program code. A bulk storage device may be implemented as a hard drive, solid state disk or other persistent data storage device. The processing system 1000 may also include one or more cache memories (not shown) that provide temporary storage of at least some program code in order to reduce the number of times program code must be retrieved from bulk storage device 1010 during execution.

Input/output (I/O) devices depicted as input device 1012 and output device 1014 may optionally be coupled to the data processing system. Examples of input devices may include, but are not limited to, for example, a microphone, a keyboard, a pointing device such as a mouse, a touchscreen or the like. Examples of output devices may include, but are not limited to, for example, a monitor or display, speakers, or the like. Input device and/or output device may be coupled to data processing system either directly or through intervening I/O controllers. A network adapter 1016 may also be coupled to, or be part of, the data processing system to enable it to become coupled to other systems, computer systems, remote network devices, and/or remote storage devices through intervening private or public networks. The network adapter may comprise a data receiver for receiving data that is transmitted by said systems, devices and/or networks to said data and a data transmitter for transmitting data to said systems, devices and/or networks. Modems, cable modems, and Ethernet cards are examples of different types of network adapter that may be used with data processing system 1000.

As shown in FIG. 10, memory elements 1004 may store an application 1018. It should be appreciated that the data processing system 1000 may further execute an operating system (not shown) that may facilitate execution of the application. The application, being implemented in the form of executable program code, may be executed by data processing system 1000, e.g., by the processor 1002. Responsive to executing the application, the data processing system may be configured to perform one or more operations to be described herein in further detail.

In one aspect, for example, the data processing system 1000 may represent a bridge device. In that case, the application 1018 may represent an application that, when executed, configures the data processing system 1000 to perform the various functions described herein with reference to bridge controller and bridge unit, or in general 'bridge', and its processor and controller. Here, the network adapter 1016 may represent an embodiment of the bridge unit. In another aspect, the data processing system 1000 may represent a streaming controller. In that case, the application 1018 may represent an application that, when executed, configures the data processing system 1000 to perform the various functions described herein with reference to the streaming controller.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

Acronyms

DANE DASH aware network element
DASH Dynamic Adaptive Streaming over HTTP
HTTP Hypertext Transfer Protocol
MANE media adaptation network entity
MPEG video encoding standard of the Moving Picture Experts Group
QoE quality of experience
QoS quality of service
SAND server and network assisted DASH
SDN software defined networking
SVC scalable video coding
URL Uniform Resource Locator

REFERENCES

[1] Jan Willem Kleinrouweler, Sergio Cabrero, and Pablo Cesar. 2016. Delivering stable high-quality video: an SDN architecture with DASH assisting network elements. In *Proceedings of the 7th International Conference on Multimedia Systems* (MMSys '16). ACM, New York, N.Y., USA, Article 4, 10 pages. DOI: http://dx.doi.org/10.1145/2910017.2910599
[2] James Nightingale, Qi Wang, Jose M. Alcaraz Calero, Enrique Chirivella-Perez, Marian Ulbricht, Jesús A. Alonso-López, Ricardo Preto, Tiago Batista, Tiago Teixeira, Maria Joao Barros, Christiane Reinsch. 2016. QoE-Driven, Energy-Aware Video Adaptation in 5G Networks: The SELFNET Self-Optimisation Use Case. International Journal of Distributed Sensor Networks. Vol 12, Issue 1. http://dx.doi.org/10.1155/2016/7829305
[3] WO 2014147538 A1, Bandwidth management for over-the-top adaptive streaming
[4] Panagiotis Georgopoulos, Yehia Elkhatib, Matthew Broadbent, Mu Mu, and Nicholas Race. 2013. Towards network-wide QoE fairness using openflow-assisted adaptive video streaming. In Proceedings of the 2013 ACM SIGCOMM workshop on Future human-centric multimedia networking (FhMN '13). ACM, New York, N.Y., USA, 15-20. DOI=http://dx.doi.org/10.1145/2491172.2491181
[5] MPEG DASH, "Information technology—Dynamic adaptive streaming over HTTP (DASH)—Part 5: Server and network assisted DASH (SAND)", ISO/IEC CD 23009-5, 19 Feb. 2015, draft

The invention claimed is:
1. Stream control system for use in a network, the network comprising
  network resources including nodes and links connecting the nodes, and
  at least one network controller having a network controller interface for exchanging network control data, the network controller being arranged to control one or more network resources;
  the network being arranged for transferring at least one video stream from a video server to a video client via a distribution chain of network resources,
  the distribution chain comprising a server node coupled to the video server and a client node coupled to the video client;
  wherein the stream control system comprises a bridge unit, a bridge controller and a streaming controller arranged to control streaming settings at the client node;
  the bridge unit being coupled to the bridge controller and being arranged to exchange messages with the network controller and the streaming controller by
    communicating with the network controller interface, and
    communicating with the streaming controller;

the bridge controller being arranged to control the video stream by
obtaining, from the streaming controller, at least one streaming-control request, the request including a bandwidth requirement of the video stream;
obtaining, via the network controller interface, network resource data including bandwidths available on network resources,
determining, for the request, a resource allocation including an allocated bandwidth based on the network resource data and the streaming-control request, the allocated bandwidth being equal to, or lower than, the bandwidth requirement so that the video stream complies with the network resource data;
transferring, to the streaming controller, the allocated bandwidth so as to enable the streaming controller to control, in accordance with the allocated bandwidth, the streaming settings for the client; and
transferring, to the network controller, network control data to control, in accordance with the allocated bandwidth, the respective distribution chain associated to the respective video stream;
wherein the streaming controller is arranged
to exchange streaming control data with the bridge controller, the streaming control data including the streaming-control request and the allocated bandwidth; and
to control, in accordance with the allocated bandwidth, the streaming settings for the client.

2. System as claimed in claim 1, wherein the bridge controller is arranged to obtain the network resource data including bandwidths available on network resources associated to the distribution chain for the video stream.

3. System as claimed in claim 1, wherein the bridge controller is arranged to
obtain the network resource data including delays introduced by network resources; and
determine the resource allocation so that the distribution chain complies with a delay requirement of the video stream included in the request.

4. System as claimed in claim 1, wherein the bridge controller is arranged to control, according to the allocated bandwidth, in the distribution chain at least one of:
a network forwarding element coupled to the video server to cap the traffic of the video stream;
a quality of service manipulation function of a network resource.

5. System as claimed in claim 1, wherein the bridge controller is arranged to maintain client information about currently connected clients, the client information comprising at least one of:
a client identifier;
a client internet protocol address (IP);
a client media access address (MAC);
a client port number;
a client TCP ISN (initial sequence number);
option data in one of the unused/experimental options fields of the TCP header;
option kind in one of the unused/experimental options fields of the TCP header;
a client QUIC connection ID;
client video streaming requirements data;
client minimum bandwidth;
client maximum bandwidth.

6. Bridge device for use in the network as defined in claim 1, the bridge device comprising the bridge unit and the bridge controller.

7. Bridge device as claimed in claim 6, wherein the bridge controller is arranged to process the streaming control data comprising at least one of
an add command to add at least one new streaming client to a list of clients maintained by the bridge controller;
a delete command to remove at least one client from the list of clients;
an update command to notify the bridge controller that parameters of a client have changed;
a get client command to retrieve values relative to a client on the list of clients;
a client resource update command to communicate a change of the resource allocation for at least one client;
a resource update command to communicate a change of the resource allocation.

8. Bridge device as claimed in claim 6, the device further comprising the network controller device.

9. Streaming controller device for use in the network as defined in claim 1, the streaming controller device comprising the streaming controller, wherein the streaming controller is arranged
to exchange streaming control data with the bridge controller, the streaming control data including the streaming-control request and the allocated bandwidth; and
to control, in accordance with the allocated bandwidth, the streaming settings for the client.

10. Streaming controller device as claimed in claim 9, wherein the streaming controller is arranged to process the streaming control data comprising at least one of
an add command to add at least one new streaming client to a list of clients maintained by the bridge controller;
a delete command to remove at least one client from the list of clients;
an update command to notify the bridge controller that parameters of a client have changed;
a get client command to retrieve values relative to a client on the list of clients;
a client resource update command to communicate a change of the resource allocation for at least one client;
a resource update command to communicate a change of the resource allocation.

11. Streaming controller device as claimed in claim 9, the device comprising the bridge unit and the bridge controller.

12. Bridge control method for use in a network, the network comprising
network resources including nodes and links connecting the nodes, and
at least one network controller having a network controller interface for exchanging network control data, the network controller being arranged to control one or more network resources;
the network being arranged for transferring at least one video stream from a video server to a video client via a distribution chain of network resources,
the distribution chain comprising a server node coupled to the video server and a client node coupled to the video client;
wherein the bridge control method is arranged
to cooperate with a streaming controller arranged to control streaming settings at the client node; and
to exchange messages with the network controller and the streaming controller by
communicating with the network controller interface, and communicating with the streaming controller;
the bridge method comprising, to control the video stream, obtaining, from the streaming controller, at least one streaming-control request, the request including a bandwidth requirement of the video stream;

obtaining, via the network controller interface, network resource data including bandwidths available on network resources, determining, for the request, a resource allocation including an allocated bandwidth based on the network resource data and the streaming-control request, the allocated bandwidth being equal to, or lower than, the bandwidth requirement so that the video stream complies with the network resource data;

transferring, to the streaming controller, the allocated bandwidth so as to enable the streaming controller to control, in accordance with the allocated bandwidth, the streaming settings for the client; and transferring, to the network controller, network control data to control, in accordance with the allocated bandwidth, the respective distribution chain associated to the respective video stream.

13. A non-transitory computer-readable medium comprising a computer program, the computer program comprising instructions for causing a processor system to perform the method according to claim 12.

* * * * *